US006523055B1

(12) United States Patent
Yu et al.

(10) Patent No.: US 6,523,055 B1
(45) Date of Patent: Feb. 18, 2003

(54) CIRCUIT AND METHOD FOR MULTIPLYING AND ACCUMULATING THE SUM OF TWO PRODUCTS IN A SINGLE CYCLE

(75) Inventors: Robert K. Yu, Newark, CA (US); Satish Padmanabhan, Sunnyvale, CA (US); Chakra R. Srivatsa, San Jose, CA (US); Shailesh I. Shah, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/235,417

(22) Filed: Jan. 20, 1999

(51) Int. Cl.[7] .............................. G06F 7/38; G06F 7/52
(52) U.S. Cl. ...................... 708/603; 708/620; 708/625
(58) Field of Search ................................ 708/603, 626, 708/523–524, 620, 625

(56) References Cited

U.S. PATENT DOCUMENTS

| | | | |
|---|---|---|---|
| 4,575,812 A | 3/1986 | Kloker et al. | 364/760 |
| 4,594,679 A | 6/1986 | George et al. | 364/754 |
| 4,638,449 A | 1/1987 | Frey | 364/760 |
| 4,683,547 A | 7/1987 | DeGroot | 364/748 |
| 4,754,421 A | 6/1988 | Bosshart | 364/757 |
| 4,809,212 A | 2/1989 | New et al. | 364/757 |
| 4,811,269 A | 3/1989 | Hirose et al. | 364/754 |
| 4,825,401 A | 4/1989 | Ikumi | 364/760 |
| 4,831,577 A | 5/1989 | Wei et al. | 364/754 |
| 4,868,778 A | 9/1989 | Disbrow | 364/757 |
| 4,989,168 A | 1/1991 | Kuroda et al. | 364/715.09 |
| 5,070,471 A | 12/1991 | Dao-Trong et al. | 364/760 |
| 5,138,574 A | 8/1992 | Aoki et al. | 364/754 |
| 5,442,799 A | * 8/1995 | Murakami et al. | 708/626 |
| 5,446,651 A | 8/1995 | Moyse et al. | 364/760 |
| 5,477,479 A | 12/1995 | Ochi | 364/760 |
| 5,521,856 A | 5/1996 | Shiraishi | 364/760 |
| 5,586,070 A | 12/1996 | Purcell | 364/754 |

FOREIGN PATENT DOCUMENTS

JP 57-69451 4/1982

OTHER PUBLICATIONS

"A 15 NS 32×32–Bit CMOS Multiplier With An Improved Parallel Structure"; M. Nagamatsu, S. Tanaka, J. Mori, T. Noguchi and K. Hatanaka; IEEE 1989 Custom Integrated Circuits Conference.

(List continued on next page.)

Primary Examiner—Tan V. Mai
(74) Attorney, Agent, or Firm—Hitt, Gaines & Boisbrun, PC

(57) ABSTRACT

A multiplication accumulation circuit (abbreviated as "MAC") has five input buses that carry signals for operands A, B, C, D and E, a control bus that carries signals for controlling the operations performed on the received operands, and an output bus that carries a signal generated by the MAC. Each of operands A, B, C and D can be four different operands that are used as follows by the MAC: (1) to perform two multiplications simultaneously, and (2) to perform an addition of the products of the two multiplications and the fifth operand E, e.g. generate on the output bus a signal of value A*C+B*D+E. Alternatively, operands A and B can be, respectively, the upper and lower halves of a first double word to be used as a multiplicand. Similarly, operands C and D can be the upper and lower halves of a second double word to be used as a multiplier. In this case, the four operands A, B, C and D are used as follows by the MAC: (1) to perform a single multiplication of the first double word with the second double word, and (2) to perform an addition of the product of the double word multiplication, and the fifth operand E, e.g. generate on the output bus a signal of value [A,B]*[C,D]+E.

24 Claims, 7 Drawing Sheets

OTHER PUBLICATIONS

"Computer Organization" Third Edition; V. Carl Hamacher, Zvonko G. Vrenesic and Safwat G. Zaky; McGraw–Hill, Inc., 1990, pp. 282–291.

"Computer Architecture—A Quantitative Approach" Second Edition; David A. Patterson, John L. Hennessy, David Goldberg; Morgan Kaufmann Publishers, Inc., 1996, Appendix A.

"Computer Arithmetic Systems—Algorithms, Architecture and Implementation"; Amos R. Omondi; Prentiss Hall, 1994, pp. 119–192.

"Computer Organization and Design—The Hardware/Software Interface", John L. Hennessy, David A. Patterson, James R. Larus; Morgan Kaufmann Publishers, 1994, Chapter 4, pp. 198–212.

* cited by examiner

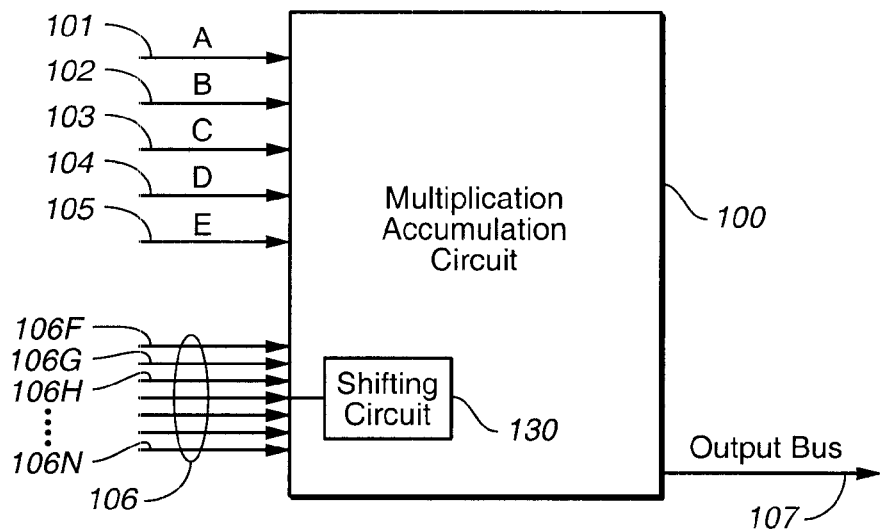
FIG._1A
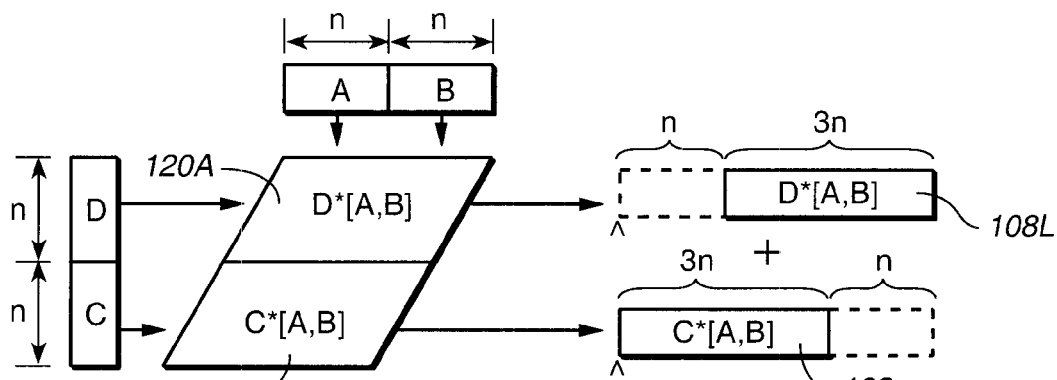
FIG._1B
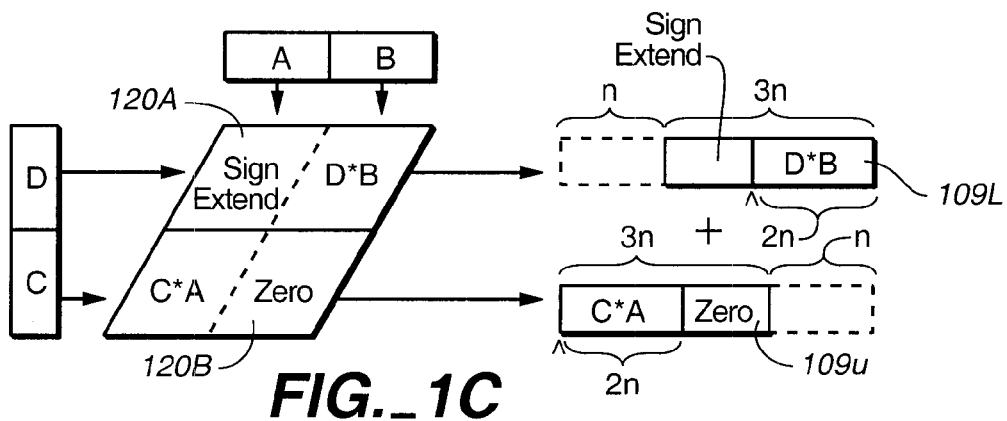
FIG._1C

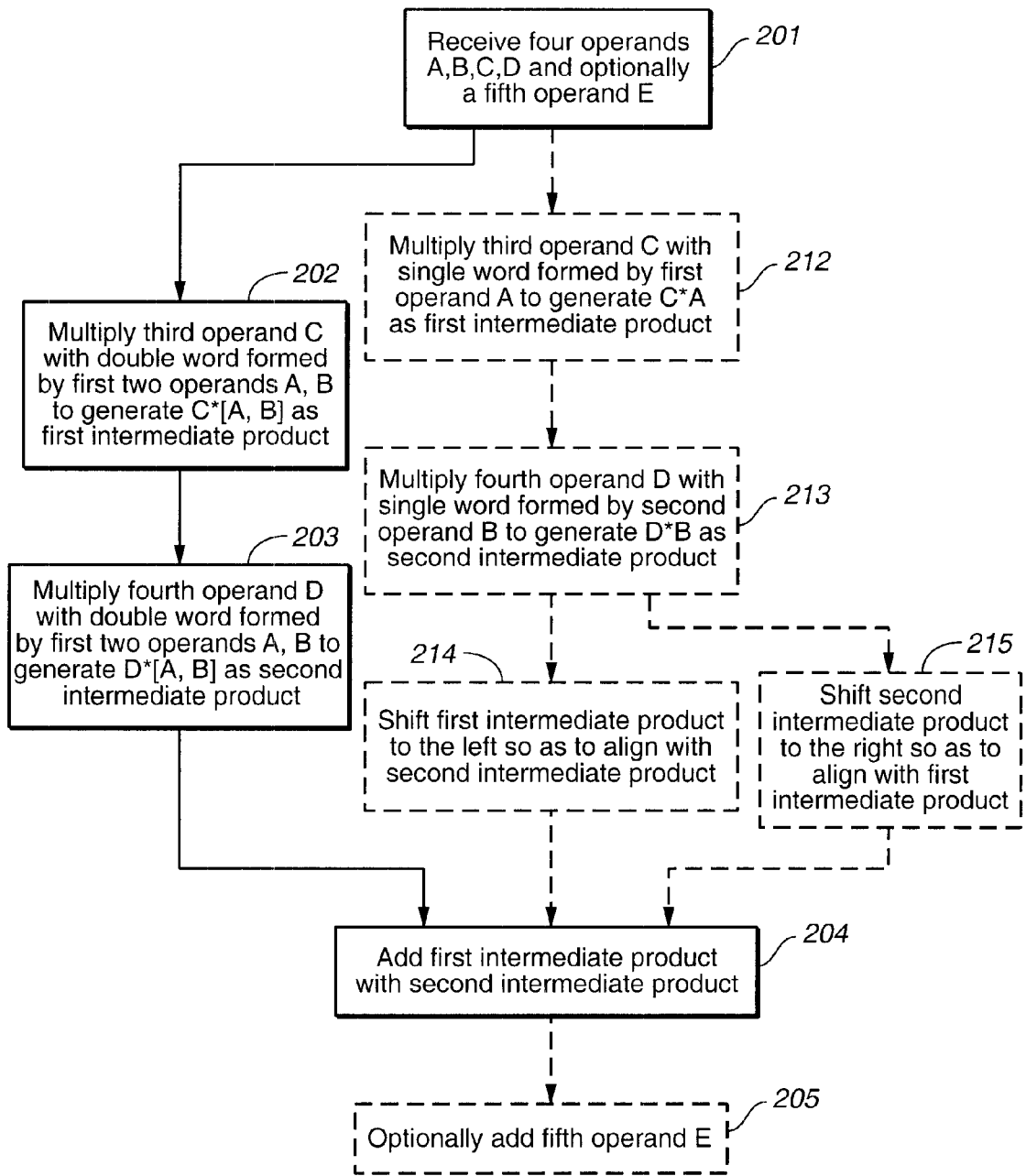
FIG._2A

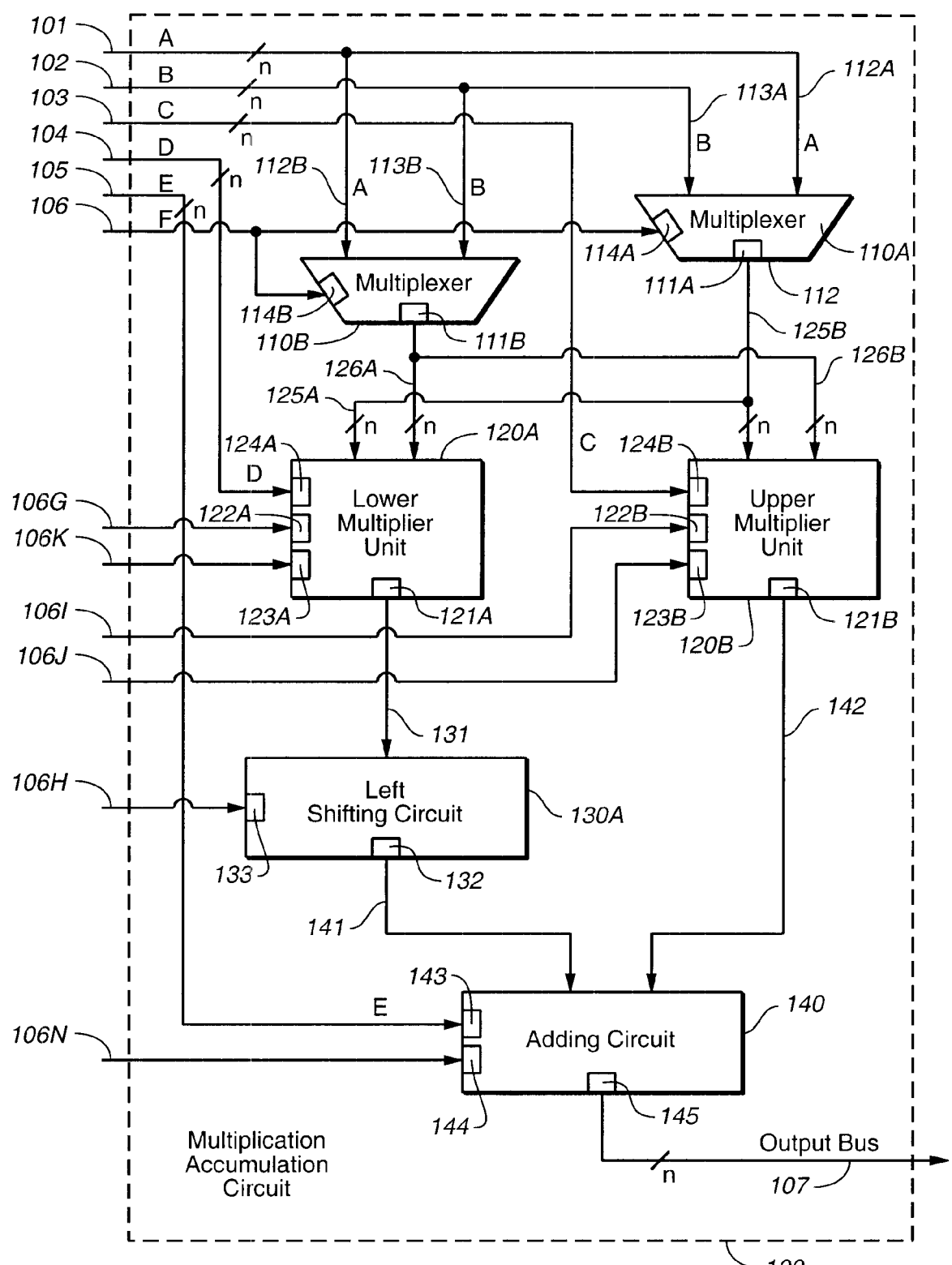
FIG._2B

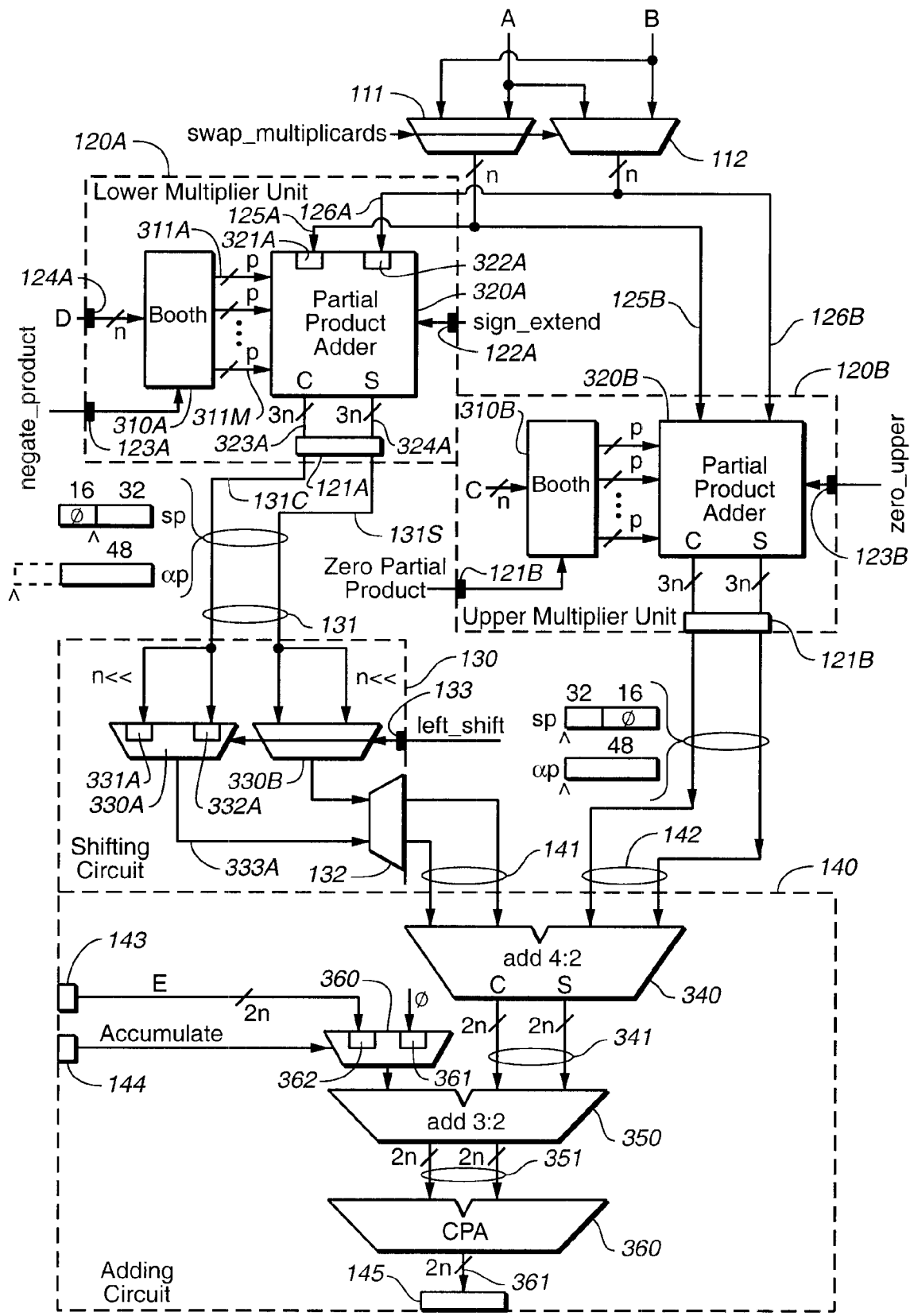
FIG._3

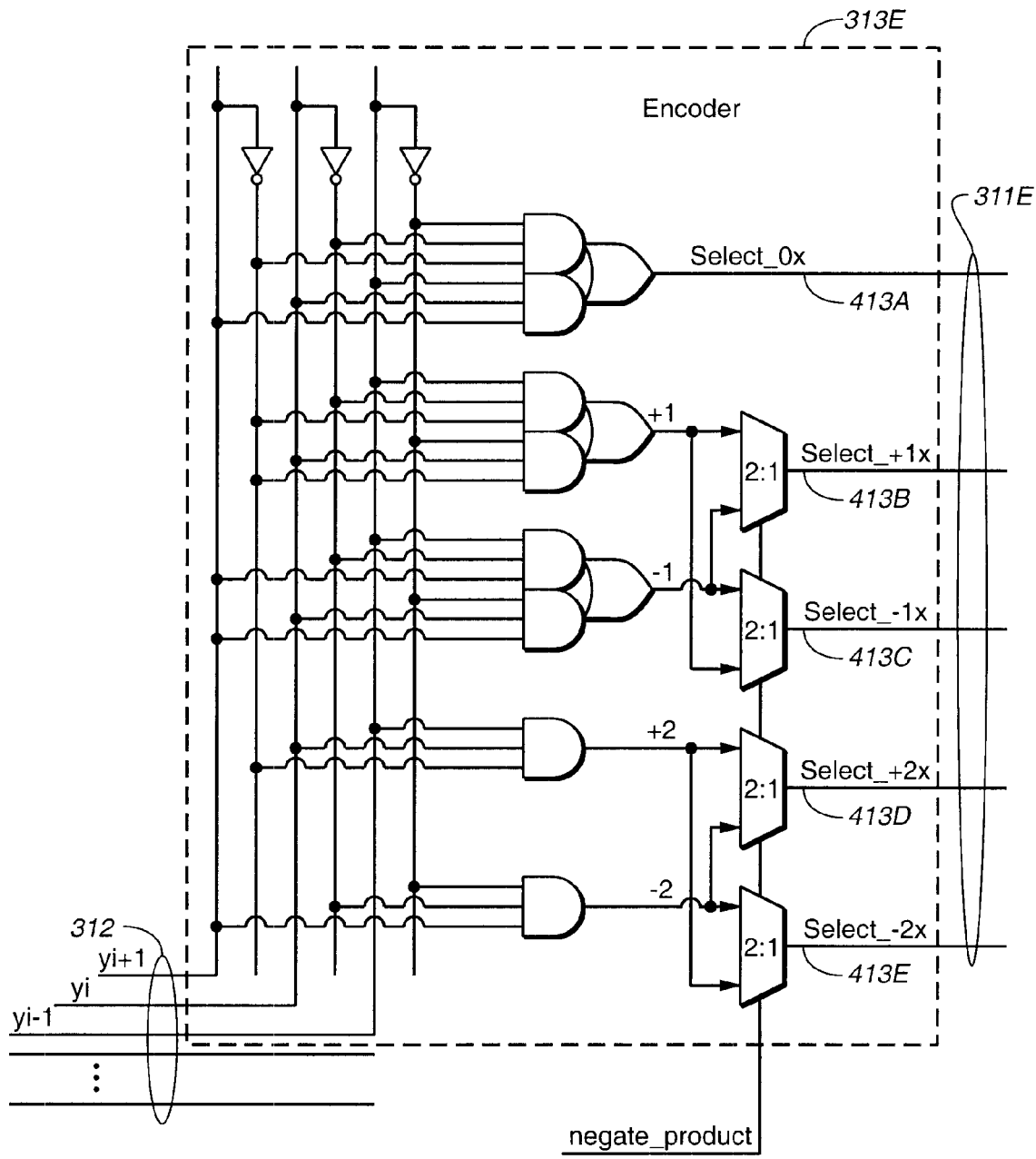
FIG._ 4A

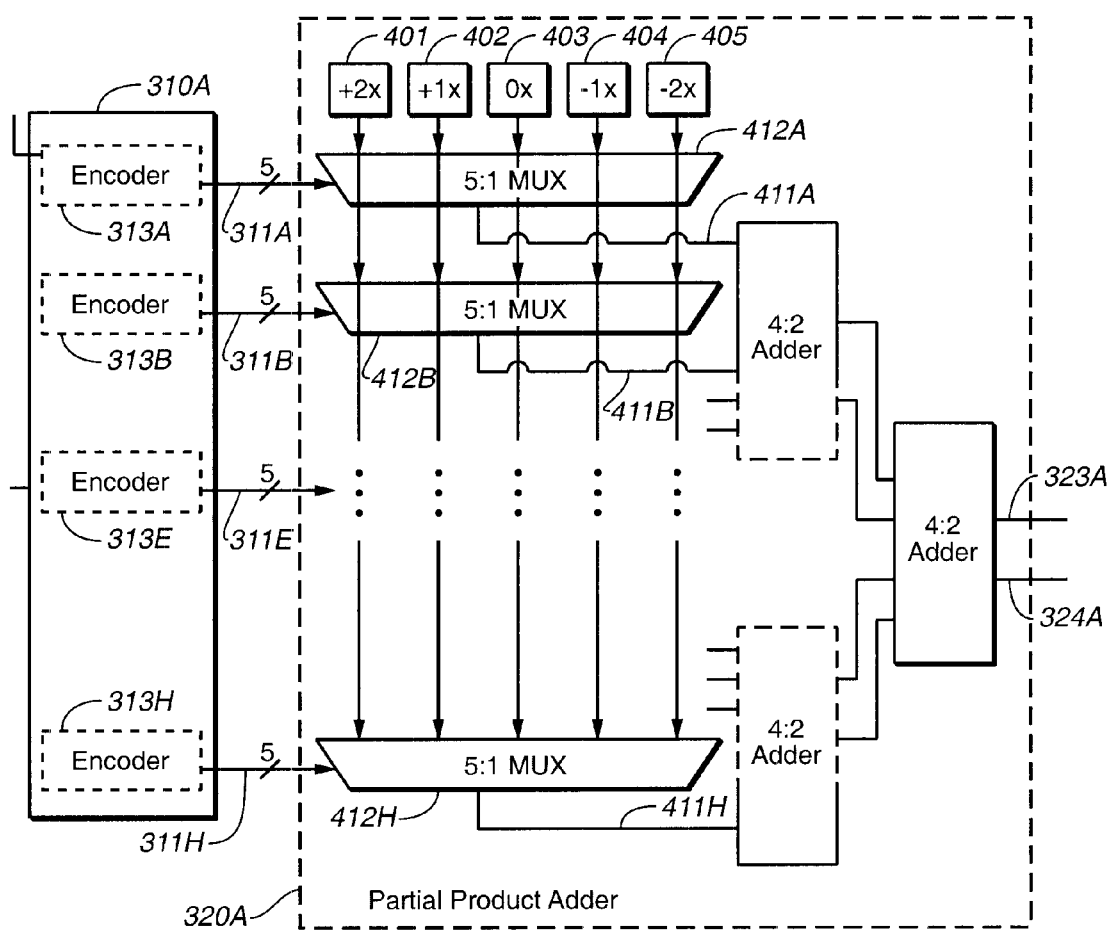
FIG._ 4B

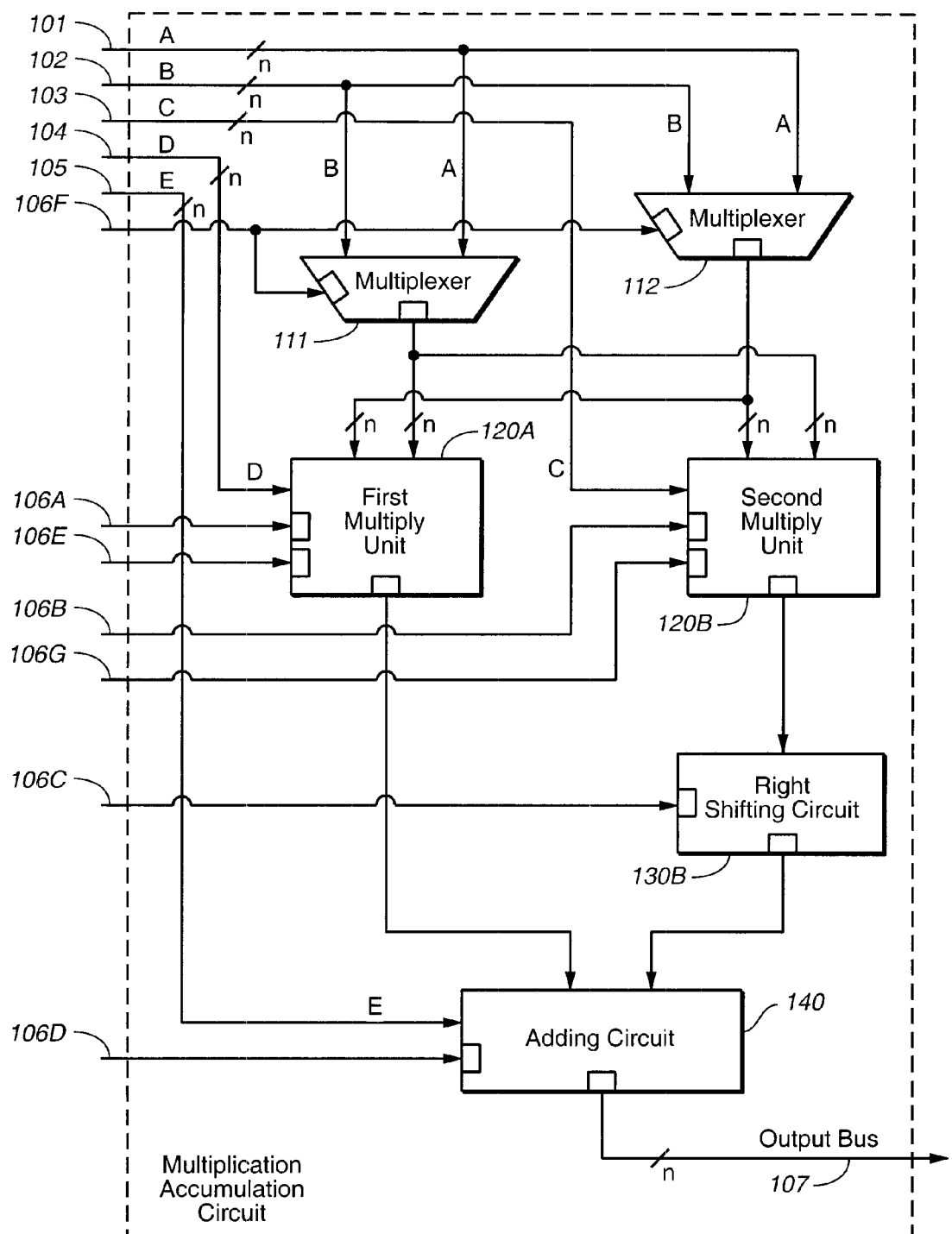
FIG._5

CIRCUIT AND METHOD FOR MULTIPLYING AND ACCUMULATING THE SUM OF TWO PRODUCTS IN A SINGLE CYCLE

CROSS REFERENCE TO RELATED APPLICATION

This application is related to, and incorporates by reference herein in its entirety, the following copending, commonly owned U.S. patent application Ser. No. 08/841,415 entitled "APPARATUS AND METHOD FOR COMPUTING THE RESULT OF A VITERBI EQUATION IN A SINGLE CYCLE" filed on Apr. 22, 1997 by Robert K. Yu and Satish Padmanabhan.

CROSS REFERENCE TO MICROFICHE APPENDICES

Appendices A and B, which are part of the present disclosure, are included in a microfiche appendix consisting of three (3) sheets of microfiche having a total of one hundred eighty-nine (189) frames, and the microfiche appendix is incorporated herein by reference in its entirety. Appendices A and B are listings of computer programs including source code in the language VERILOG for a structural embodiment and a behavioral embodiment respectively of a multiplication accumulation circuit (also called "MAC") in accordance with the invention as described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to a multiplication accumulation circuit (also referred to as "MAC") that can perform two multiplications and accumulations simultaneously, or alternatively a single multiplication and accumulation of double words.

BACKGROUND

Multiplication of two operands (typically called "multiplicand" and "multiplier") to generate a product is well known. In a paper and pencil method taught in grammar school, the digits of the multiplier are taken one at a time from the right to the left, each digit is multiplied by the multiplicand, and the resulting product (also called "intermediate product") is placed at an appropriate place, e.g. shifted left depending on the position of the multiplier's digit being used. After all digits of the multiplier are multiplied, all the intermediate products are added to generate the product. The following example (in binary) illustrates the paper and pencil method:

|   |   |   |
|---|---|---|
|   | $0010_{two}$ | multiplicand |
| × | $0110_{two}$ | multiplier |
| + | 0000 | (0 in multiplier) |
| + | 0010 | (1 in multiplier) |
| + | 0010 | (1 in multiplier) |
| + | 0000 | (0 in multiplier) |
|   | $0001100_{two}$ |   |

Computers use another method, known as "Booth's algorithm" that uses just addition, subtraction and shift operations based on examining a pair of adjacent bits in the multiplier, as illustrated by the following table:

| $a_i$ | $a_{i-1}$ | Operation |
|---|---|---|
| 0 | 0 | Do nothing; shift the product right |
| 0 | 1 | Add b to product; shift the product right |
| 1 | 0 | Subtract b from product, shift the product right |
| 1 | 1 | Do nothing; shift the product right | wherein $a_i$ refers to bit i in multiplier $a$, b is the multiplicand, and $1 \leq i \leq 4$; $a_0$ being assumed to be 0.

Booth's algorithm has been used in a multiplier that "can perform one series of multiplication of (one word) X (one word) or can simultaneously execute two series of multiplications of (half word) X (half word) under the control of a division control signal . . . " (col. 2, lines 47–52 in U.S. Pat. No. 4,825,401 granted to Ikumi). See also U.S. Pat. No. 5,586,070 granted to Purcell for another circuit "which performs selectable multiplication operations on a first word having an upper byte and a lower byte and a second word having an upper byte and a lower byte" (abstract).

SUMMARY

A multiplication accumulation circuit (also called "MAC") in accordance with the invention has at least two modes and depending on the mode performs at least one of the following multiplication operations in a single cycle, (1) multiplication of two pairs of single words (in a "dual mode") or (2) multiplication of one pair of double words, (in a "double mode"). The MAC normally operates in the double mode (also called "default mode") and goes into the dual mode when a control signal (also called "dual mode signal" is active. The dual mode signal, when active, enables a circuit (hereinafter "shifting circuit") that is included in the MAC and that is used to shift bits of an intermediate product, as described below.

Moreover, in the same cycle the MAC also optionally adds to the resulting product (or products) another operand (e.g. value of a previous accumulation) if another control signal (also called "accumulate signal") is active.

In one embodiment, the MAC has five input buses that carry signals for operands A, B, C, D and E, a control bus that carries signals for controlling the operations performed on the just-described operands, and an output bus that carries a signal generated by the MAC.

Operands A and B can be, respectively, the upper and lower halves of a first double word [A,B] to be used as a multiplicand. Similarly, operands C and D can be the upper and lower halves of a second double word [C,D] to be used as a multiplier. In this case, the four operands A, B, C and D are to be used as follows by the MAC: (1) to perform a single multiplication of the first double word with the second double word (in an operation called "double multiply"), and (2) to perform an addition of the product of the double multiply operation, and the fifth operand E, e.g. to generate on the output bus a signal of value [A,B]*[C,D]+E (in an operation called "double word MAC operation").

When the accumulate signal is inactive, the MAC does not add the fifth operand, thereby providing the result of the double word multiply operation. In the double word multiply operation, the two double words [A,B] and [C,D] can be written as $2^n*A+B$ and $2^n*C+D$, where n is the number of bits in an operand, so that the product has the value $2^{2n}*A*C+2^n*(A*D+B*C)+B*D$.

When the dual mode signal goes active, the MAC (1) uses operands A and C to perform a first multiplication and (2) uses operand's B and D to perform a second multiplication simultaneous with the first multiplication and also (3), performs an addition of the products of the two multiplications (in an operation called "dual multiply"). Optionally (if the accumulate signal is active) the MAC adds to the two products the fifth operand E, e.g. to generate on the output bus a signal of value A*C+B*D+E (in an operation called "dual MAC operation"). If the accumulate signal is inactive, the MAC disregards the fifth operand E, and therefore generates on the output bus a signal of value A*C+B*D (in the operation called "dual multiply").

In one embodiment, the MAC has a hardware circuit (in the form of, for example, complimentary metal oxide semiconductor (CMOS) logic gates) that performs the double word MAC operation, and the MAC uses the same hardware circuit with the shifting circuit to perform the dual MAC operation. Prior to addition of two intermediate products in the MAC, the shifting circuit right shifts the bits in one of the two products so that the shifted bits are appropriately aligned with bits in the other of the two products. In an alternative embodiment, certain hardware in the MAC performs the dual MAC operation, and the MAC uses the same hardware with the shifting circuit to perform the double word MAC operation. In the alternative embodiment, the shifting circuit left shifts the bits in one of the two products prior to addition.

Use of a shifting circuit to implement a double word MAC operation (or alternatively a dual MAC operation) as described herein requires fewer number of gates than in the prior art, because one of two separate adders otherwise required in the prior art to add the two intermediate products in the two different ways is eliminated. Moreover, the MAC can perform two multiplications and two additions of single word operands in a single cycle, as compared to two or more cycles otherwise required in the prior art (e.g. for adding the two intermediate products). Therefore, use of a shifting circuit as described herein allows the MAC to perform the double word MAC and dual MAC operations faster while using minimal hardware, as compared to a prior art device.

In one embodiment, the MAC is implemented by two multiplier units, each of which uses operands A and B as a double word multiplicand, or alternatively uses a selected one of the two operands A, B as a single word multiplicand. Moreover, each of the two multiplier units uses a selected one of the two operands C and D as a single word multiplier. Each multiplier unit multiplies either the double word multiplicand or the selected single word multiplicand with the selected single word multiplier, and generates a signal for one of the two intermediate products that are summed by an adding circuit.

Depending on the implementation, the shifting circuit is coupled to a selected one of the multiplier units (the other of the multiplier units being referred to as the "unselected multiplier unit"). The adding circuit is coupled to receive signals from the shifting circuit, and the unselected multiplier unit. The adding circuit sums the received signals with the fifth operand E, and passes the resulting signal to the output bus.

In a first embodiment, the shifting circuit is coupled to a first multiplier unit (also called "lower multiplier unit") that uses operand D as the single word multiplier. Furthermore, depending on the operation being performed, the shifting circuit either generates a shifted version of the signal received from the first multiplier unit, or simply passes the signal from the first multiplier unit. For example, during a double word MAC operation, the shifting circuit simply passes the signal received from the first multiplier unit directly (i.e. without shifting) to the adding circuit.

In the dual mode, the MAC also performs any one of the following two accumulate operations (in addition to the dual MAC operation) in response to appropriate control signals on the control bus. In a first accumulate operation, also referred to as "dual negative MAC operation", the MAC accumulates the difference of the two intermediate products and the fifth operand E, e.g. generates the value A*C−B*D+E. When the accumulate signal is inactive, the MAC does not add the fifth operand, thereby providing the result of the "dual negative multiply" operation. In a second accumulate operation, also referred to as "dual cross MAC operation", the MAC accumulates the sum of two other intermediate products, e.g. generates the value A*D+B*C+E. In this case as well, the MAC does not add the fifth operand, thereby providing the result of the "dual cross multiply" operation The dual negative MAC operation and the dual cross MAC operation can be used successively to configure the MAC in the dual mode, to perform a complex operation X*Y+E in just two cycles, where each of X, Y and E is a complex number. Specifically, Er and Ei represent the real and imaginary portions of operand E, A and B represent the real and imaginary portions of operand X and C and D represent the real and imaginary portions of operand Y so that the final output is (A+jB)*(C+jD)+(Er+jEi) that can be rewritten as (AC−BD)+j(AD+BC)+(Er+jEi), and further rewritten as (AC−BD+Er)+j(AD+BC+Ei). In one cycle, the MAC computes the output signal's real portion, e.g. of value A*C−B*D+Er. In another cycle (either succeeding or preceding), the MAC computes the output signal's imaginary portion, e.g. of value A*D+B*C+Ei. If necessary, the real portion and the imaginary portion can be generated simultaneously in a single cycle by use of two MACs of the type described herein.

In addition to the above-described two modes (double mode and dual mode), the MAC of this embodiment also has a single mode wherein the MAC disregards two of the operands, e.g. operands A and C. In the single mode, the MAC can perform the following two accumulate operations, or the following two multiplications if the accumulate signal is inactive. Therefore, in a first accumulate operation, also referred to as "single MAC operation", the MAC accumulates only one product, e.g. generates a signal of the value B*D+E. The MAC does not perform the addition when the accumulate signal is inactive, thereby to provide the result of a single multiply operation. In a second accumulate operation, also referred to as "single negative MAC operation", the MAC accumulates a negated product, e.g. generates a signal of the value −B*D+E. Again, the MAC does not perform the addition when the accumulate signal is inactive, thereby to provide the result of a single negative multiply operation.

Therefore, using the same hardware a total of six accumulate operations, or if the accumulate signal is inactive six multiply operations can be performed by the MAC of this embodiment. The twelve operations are each performed in a single cycle. The single cycle performance of any one of twelve different operations by the same hardware provides an order of magnitude greater flexibility in computations to be performed by an integrated circuit (IC) chip having the above-described MAC, as compared to prior art IC chips. Moreover, as noted above, an IC chip having the above-described MAC performs each of the six accumulate operations with less hardware and faster than IC chips of the prior art.

BRIEF DESCRIPTION OF THE DRAWINGS

FIG. 1A illustrates, in a high level block diagram, a multiplication accumulation circuit in accordance with the invention.

FIGS. 1B and 1C illustrate relative positions of intermediate product generated by multiplier units included in the multiplication accumulation circuit of FIG. 1A in two different modes.

FIG. 2A illustrates, in a flow chart, several steps performed by one embodiment of the multiplication accumulation circuit of FIG. 1A.

FIG. 2B illustrates, in an intermediate level block diagram, one embodiment of the multiplication accumulation circuit of FIG. 1A.

FIG. 3 illustrates, in a low level block diagram, implementation of one variant of the embodiment in FIG. 2.

FIG. 4A illustrates, in a circuit schematic, one implementation of an encoder used in a Booth circuit illustrated in FIG. 4B (below).

FIG. 4B illustrates implementation of one of the multiplier units of FIG. 3.

FIG. 5 illustrates, in an intermediate level block diagram, another embodiment of the multiplication accumulation circuit of FIG. 1A.

DETAILED DESCRIPTION

A multiplication accumulation circuit 100 (FIG. 1A) has a control bus 106, and five input buses 101–105 that respectively receive (see act 201 in FIG. 2A) signals for operands A, B, C, D and E. In one implementation (described herein), each of operands A–D is a fixed point number of having n bits (e.g. 16 bits) wherein the decimal point is to the left of the left-most bit. In this implementation, a simple unsigned fraction format is used, and operand E has 2n its. In other implementations of the invention, other formats, such as two's complement where the decimal point is to the right of the sign, may also be used.

The multiplication accumulation circuit (also called "MAC") 100 multiplies in a single cycle either (1) one pair of double words [AB,CD], or (2) two pairs of single words [A,B] and [C,D], depending on a control signal received from control bus 106, e.g. on a control line 106H included in control bus 106. MAC 100 supplies the resulting sum on an output bus 107.

MAC 100 operates in different modes depending on signals received from control bus 106. Control bus 106 includes lines 106F–106N (wherein F≦I≦N, N being the number of lines in control bus 106). Specifically, in a default mode (also called "double mode") MAC 100 uses operands A and B as the upper and lower halves respectively of a first double word [A,B] that is used as a multiplicand. In the default mode, MAC 100 also uses operands C and D as the upper and lower halves of a second double word [C,D] that is used as a multiplier. In the default mode, MAC 100 performs, in a single cycle, a multiplication (as illustrated by acts 202–204 in FIG. 2A) of the first double word [A,B] with the second double word [C,D], to generate an output bus 107 a signal of value [A,B]*[C,D] (in an operation called "double word multiplication").

In the default mode if another control signal, e.g. on control line 106N (FIG. 1A) is active, MAC 100 also adds (as illustrated by act 205 in FIG. 2A) the product [A,B]*[C,D] of the double word multiplication to the fifth operand E, e.g. to generate on output bus 107 a signal of value [A,B]*[C,D]+E (in an operation called "double word MAC operation").

To perform multiplications, MAC 100 includes two multiplier units 120A and 120B (FIG. 1B). In the default mode, each of units 120A and 120B uses the two operands A and B as a double word multiplicand [A,B]. Therefore, first multiplier unit 120A generates ,a first signal 108L (FIG. 1B) of 3n bits for the intermediate product D*[A,B] as illustrated by act 203 (FIG. 2A), and second multiplier unit 120B generates a second signal 108U (FIG. 1B) also of 3n bits for the intermediate product C*[A,B] as illustrated by act 202 (FIG. 2A). The specific order of performance of acts 203 and 204 can be changed, and in one embodiment these two acts are performed simultaneously.

First signal 108L does not have any values in the first n bits after the decimal point (illustrated in FIG. 1B as a "^"). Therefore, first signal 108L has n additional bits located at a position 3n bits after the decimal point, while second signal 108U has 3n bits after the decimal point. In the default mode, MAC 100 does not use shifting circuit 130, and instead simply adds (as illustrated by act 204 in FIG. 2A) the values of first signal 108L and second signal 108U in the double word multiplication operation.

However, in another mode (also called "dual mode"), MAC 100 multiplies two pairs of single words [A,B] and [C,D] simultaneously and adds the products of the two multiplications and optionally adds the fifth operand E, thereby to generate on output bus 107 a signal of value A*C+B*D+E (in an operation called "dual MAC operation"). Specifically, in the dual mode, each of multiplier units 120A and 120B uses only one of the two operands A and B as a single word multiplicand. In this mode MAC 100 multiplies third operand C with a single word formed by first operand A to generate a first signal of value C*A as a first intermediate product, as illustrated by act 212 in FIG. 2A. MAC 100 also multiplies fourth operand D with another single word formed by second operand B to generate a second signal of value D*B as a second intermediate product, as illustrated by act 213 in FIG. 2A.

Specifically, multiplier unit 120A uses operand B as the multiplicand and generates a signal 109L (FIG. 1C) of 3n bit words for the intermediate product D*B in the lowermost 2n bits, and extends the sign of the 2n bits into the uppermost n bits of the 3n word. Similarly, second multiplier unit 120B generates a signal 109U of 3n bits for the intermediate product C*A in the uppermost 2n bits, and zeros the lowest n bits of the 3n bit word.

Thereafter, a shifting circuit 130 (FIG. 1A) shifts bits in a selected one of the two 3n bit signals by n bits to the left or right as appropriate to align bits in the shifted signal with bits in the unselected signal for addition of the two signals each with the other and optionally with the fifth operand E. If the selected signal is the first signal 109L, shifting circuit 130 shifts bits in signal 109L to the left by n bits so that bits in the shifted signal are aligned with bits in signal 109U, as illustrated by act 214 in FIG. 2A. Alternatively, if the selected signal is 109U, shifting circuit 130 shifts bits in signal 109U by n bits to the right, so that bits in the shifted signal are aligned with bits in signal 109L, as illustrated by act 215 in FIG. 2A.

As noted above, MAC 100 adds the two intermediate products C*A and D*B (after alignment as described above) to generate a signal of value C*A+D*B, as illustrated by act 204, and optionally adds the fifth operand E as illustrated by act 205.

Use of shifting circuit 130 as described herein eliminates the need for one of two separate adders otherwise required in the prior art to sum the two pairs of signals 108L, 108U and 109L, 109U in the two modes. Therefore, MAC 100 as described herein is faster and uses less hardware as compared to a prior art device having two separate adders.

Moreover, the specific implementation of MAC 100 illustrated in FIG. 1C performs multiplication D*B on the right side in multiplier unit 120A and C*A on the left side in multiplier unit 120B (FIG. 1C) so that the wires that carry the signals A and B are routed in a distributed manner (e.g. vertically), thereby to allow units 120A and 120B to be placed and routed in a single combined unit.

In one implementation, each of units 120A and 120B is implemented by a binary tree structure of the type described in the article entitled "A 15NS 32×32-BIT CMOS MULTIPLIER WITH AN IMPROVED PARALLEL STRUCTURE" that is incorporated by reference herein in its entirety. In other implementations of the invention, each of units 120A and 120B can be implemented by a different structure, such as a two dimensional array of cells, wherein each cell includes an AND gate and a carry save adder of the type shown in FIG. 7.8 on page 283 of the book "COMPUTER ORGANIZATION", by V. Carl Hamacher at al., McGraw-Hill, Inc. 3rd edition, 1990, that is incorporated by reference herein in its entirety.

In one particular embodiment, a multiplication accumulation circuit 100 has a left shifting circuit 130 (FIG. 2B) that shifts bits of the first signal 109L (FIG. 1C; received on bus 131 in FIG. 2B) to the left. Specifically, in this embodiment, first multiplier unit (also called "lower multiplier unit") 120A (FIG. 2B) has a number of output terminals (hereinafter "first multiply terminals") 121 A that are coupled to a number of input lines (also called "shift input lines") 131 of left shifting circuit 130A.

Shifting circuit 130 also has a number of output terminals (hereinafter "shift output terminals") 132 that are coupled to a number of input lines (hereinafter "first group of adding input lines") 141 of adding circuit 140. Adding circuit 140 also has another group of input lines (hereinafter "second group of adding input lines") 142 that are coupled to a number of terminals (hereinafter "second output terminals") 121B of second multiplier unit (also called "upper multiplier unit") 120B. Adding circuit 140 also has a number of input terminals (hereinafter "accumulate input terminals") 143 that are coupled to the fifth input bus 105. Therefore, adding circuit 140 receives on accumulate input terminals 143 the fifth operand E.

Each of multiplier units 120A and 120B is coupled to the first and second input buses 101 and 102 to receive the first and second operands A and B, as described more completely below. Moreover, each of multiplier units 120A and 120B have input terminals 124A and 124B that are respectively coupled to fourth input bus 104 and third input bus 103, thereby to respectively receive fourth operand D and third operand C. Each of multiplier units 120A and 120B also has one or more control terminals that are coupled to control bus 106. Specifically, multiplier unit 120 has two control terminals 122A and 123A that are respectively coupled to lines 106G and 106H included in control bus 106. Similarly, multiplier unit 120B has two control terminals 122B and 123B that are respectively coupled to control lines 106I and 106J included in control bus 106.

In the default mode, multiplier units 120A and 120B receive inactive signals from control bus 106, and generate on the respective output terminals 121A and 121B signals of values [A,B]*D and [A,B]*C. Moreover, in the default mode, shifting circuit 130 receives an inactive signal on control terminal 133 that is coupled to line 106H (described above) in control bus 106. Therefore, shifting circuit 130 is disabled from shifting, i.e. supplies on terminals 132 a signal of value [A,B]*D.

Furthermore, in the default mode, adding circuit 140 can receive an active signal (also referred to as "accumulate signal") on a control terminal 144 that is coupled to a line 106N in control bus 106. In response to an active accumulate signal, adding circuit 140 generates on output terminals 145 a signal of value [A, B]*[C,D]+E. In this manner, in the default mode, multiplication accumulation circuit 100 performs a double word MAC operation or a double word multiplication. However, MAC 100 can be configured to perform other operations by driving various signals active or inactive on control bus 106, as described below.

Specifically, MAC 100 operates in the dual mode in response to three active signals on control bus 106. For example, in response to a first active signal (also called "zero upper partial product signal") on a control terminal (also called "zero partial product terminal") 122A, lower multiplier unit 120A generates on output terminals 121A signal 109L (FIG. 1C) of value D*B. Lower multiplier unit 120A (FIG. 2B) does not include in the generated signal 109L the value D*A, and instead extends the sign in the value D*B into the upper n bits of the 3n bits in signal 109L.

Similarly, upper multiplier unit 120B also has a zero partial product terminal 122B and in response to a second active signal (also called "zero lower partial product signal") on control terminal 122B, generates on output terminals 121B signal 109U (FIG. 1C) of value C*A. Therefore, upper multiplier unit 120B (FIG. 2B) does not include in the generated signal the value C*B, and instead zeros out the lower n bits of the 3n bits in signal 109W.

Left shifting circuit 130 is responsive to a third active signal (hereinafter "left shift signal") on enable terminal 133. Therefore, in response to the active left shift signal, left shifting circuit 130 left shifts all bits in the first intermediate signal D*B received on shift input lines 133, and supplies the shifted signal on shift output terminals 132. Finally, in response to a fourth active signal (also called "accumulate signal"), adding circuit 140 adds the left shifted signal received on adding input lines 141 with the second intermediate signal of value C*A received on adding input lines 142, and the input signal for operand E received on adding input terminals 143. Therefore, at the end of a single cycle, adding circuit 140 generates on adding output terminals 145 a signal of value A*C+B*D+E, thereby to complete a dual MAC operation.

In the dual mode, MAC 100 can perform operations other than the above-described dual MAC operation, if in addition to the above-described four active signals, other signals are active on control bus 106 as described below.

Specifically, in response to a fifth active signal (also called "negate product signal") on another control terminal (also called "negate product terminal") 123A (FIG. 2B) that is coupled to control line 106K, lower multiplier unit 120A supplies on terminals 121A a first intermediate signal of value −B*D because the zero upper partial product signal (described above) is active. Thereafter, shifting circuit 130 left shifts the first intermediate signal B*D (in the manner described above) and adding circuit 140 generates on adding output terminals 145 a signal of value A*C−B*D+E due to the active accumulate signal on control terminal 144.

In the embodiment illustrated in FIG. 2B, input buses 125A and 125B of multiplier units 120A and 120B are not directly connected to the input buses 101 and 102, but rather are connected to output terminals 111A of a multiplexer 110A that has two input buses 112A and 113A that are respectively connected to input buses 101 and 102. Multiplexers 110A and 110B also have select terminals 114A and 114B that are connected to another control line 106F, and are responsive to a control signal (also called "swap multiplicands signal") on control bus 106. Multiplexer 110A normally passes the signal of operand A on multiplexer input bus 112A to output terminals 111A if the signal on a select terminal 114A is inactive. However, in response to an active signal on select terminal 114A, multiplexer 110A passes a signal of operand B from multiplexer input bus 113A to output terminals 111A.

Similarly, input buses 126A and 126B of multiplier units 120A and 120B are connected to output terminals 111B of multiplexer 110B that has multiplexer input buses 112B and 113B respectively connected to input buses 101 and 102. Multiplexer 110B operates in a manner similar to that discussed above for multiplexer 110A, except that when multiplexer 110A passes the signal from bus 112A to bus 125B, at the same time multiplexer 110B passes the signal from bus 113B to bus 126A. Therefore, in response to an active signal on line 106F of control bus 106, multiplier units 120A and 120B receive operands B and A as the double word multiplicand [B,A] (instead of multiplicand [A,B]).

Next, lower multiplier unit 120A generates on output terminals 121A a first intermediate signal of value D*A because the zero upper partial product signal is active. Simultaneously, upper multiplier unit 120B generates on corresponding output terminals 121B a second intermediate signal of value C*B because the zero lower partial product signal is active. Thereafter, left shifting circuit 130 generates on output terminals 132 a left shifted version of the first intermediate signal 109L because the left shift signal is active. Next, adding circuit 140 generates on output terminals 145 a signal of value A*D+B*C+E because the accumulate signal is active.

The dual negative MAC operation and the dual cross MAC operation can be used successively to configure MAC 100 to perform a complex operation in just two cycles. Specifically, in a first cycle, MAC 100 performs the dual negative MAC operation to generate an output signal's real portion, for example of value A*C−B*D+Er, wherein Er is the real portion of operand E. Next, in the second cycle, MAC 100 performs the dual cross MAC operation to generate the output signal's imaginary portion, e.g. of value A*D+B*C+Ei, wherein Ei is the imaginary portion of operand E. The order of the just-described two cycles is not critical, i.e., the order can be reversed. Also, if necessary, the complex operation can be performed in a single cycle by use of two MACs (of the type described herein) to the simultaneously generate the real portion and the imaginary portion of the output signal.

In addition to the above-described modes (i.e. the dual mode and the double mode), MAC 100 can also operate in another mode called "single mode" in response to another active signal (also called "zero intermediate product signal") on control bus 106. Specifically, in this particular embodiment, upper multiplier unit 120B has another control terminal 123B that is coupled to a control line 106J to receive the zero intermediate product signal. In response to an active signal on control terminal 120B, upper multiplier unit 120B drives a signal of value 0 (i.e. zero) on output terminals 121B. That is, upper multiplier unit 120B is effectively disabled in the single mode of MAC 100.

By use of the zero intermediate product signal, multiplication accumulation circuit 100 can be configured to perform any one of the following four operations using a single word multiplier D: a single MAC operation, a single negative MAC operation, a single word multiplication and a negative word multiplication. For each of the four operations, the swap multiplicands signal (described above) and the left shift signal are inactive. Moreover, the zero upper partial product signal is active and therefore, MAC 100 disregards operand A as well (in addition to operand C).

Specifically, in response to the active zero upper partial product signal, upper multiply unit 120B generates a second intermediate signal of value zero while in response to an inactive negate product signal, lower multiply unit 120A generates a first intermediate signal of value B*D. Next, shifting circuit 130 passes the first intermediate signal directly (i.e. without any shifting) to adding circuit 140. Adding circuit 140 therefore generates on output terminals 145 a signal of value B*D+E, thereby to complete a single MAC operation.

However, if the negate product signal is active, lower multiply unit 120A generates on output terminals 121A a first intermediate signal of value −B*D, and shifting circuit 130 passes the first intermediate signal directly to adding circuit 140. Adding circuit 140 in turn generates on output terminals 145 a signal of value −B*D+E thereby to complete a single negative MAC operation.

Furthermore, if the accumulate signal is inactive, adding circuit 140 simply passes the signal received from shifting circuit 130 directly to output terminals 145. Therefore, when the negate product signal is inactive (as described above for the single MAC operation), lower multiply unit 120A simply passes to terminals 121A a first intermediate signal of value B*D that in turn is passed by shifting circuit 130 and adding circuit 140 to output bus 107, thereby to complete a single word multiplication. Similarly, in response to an active negate product signal, lower multiplier unit 120A generates a first intermediate signal of value −B*D (as described above for the single negative MAC operation), that is then passed by shifting circuit 130 and adding circuit 140 directly to output bus 107, thereby to complete a negative word multiplication.

Each of the various components of the embodiment in FIG. 2B can be implemented using a number of different structures as would be apparent to a person skilled in the art of designing integrated circuits to implement arithmetic operations. In one implementation, each of units 120A and 120B is implemented by a binary tree structure of the type described in the article entitled "A 15NS 32×32-BIT CMOS MULTIPLIER WITH AN IMPROVED PARALLEL STRUCTURE" that is incorporated by reference herein in its entirety. In other implementations of the invention, each of units 120A and 120B can be implemented by a different structure, such as a two dimensional array of cells, wherein each cell includes an AND gate and a carry save adder of the type shown in FIG. 7.8 on page 283 of the book "COMPUTER ORGANIZATION", by V. Carl Hamacher et al., McGraw-Hill, Inc. 3rd edition, 1990, that is incorporated by reference herein in its entirety.

Multiplier units 120A and 120B can also be implemented using structures that perform the well known modified Booth's method for generating an encoded signal by recognizing predetermined patterns of bits as described in, for example, Appendix A of Computer Organization and Design, The Hardware/Software Interface by John L. Hennessy and David A. Patterson, Morgan Kaufmann Publishers, San Mateo, Calif. 1994.

In one particular embodiment, lower multiplier unit 120A (FIG. 3) includes a circuit (hereinafter "Booth circuit") 310A coupled to input terminals 124A, to receive a signal for operand D. Depending on the variant, Booth circuit 310A can implement either the Booth method using radix 2 encoding or the modified Booth method using the radix 4 encoding.

Booth circuit 310A uses operand D to generate a number of encoded signals on buses 311A–311M (wherein A≦I≦M, M being the number of such buses, e.g. 8 buses in which case M=H) that are coupled to a partial product adder 320A. Partial product adder 320A has terminals 321A and 322A coupled to the input lines 125A and 126A (described above) to receive input signals for operands A and B, and generates on output lines 323A and 324A a signal of value D*A+D*B in the carry save format. Output lines 323A and 324A are respectively 3n in number and are coupled via output terminals 121A (described above) and lines 131C and 131S to multiplexers 330A and 330B in shifting circuit 130. In response to an active signal at control terminal 122A (also called "sign extend signal"), partial product adder 320A extends the sign of the 2n bits of the intermediate product D*B into the uppermost n bits of a 3n word as illustrated in FIG. 1B and described above.

Upper multiplier unit 120B is implemented by a Booth circuit 310B and a partial product adder 320B that are similar to the above-described Booth circuit 310A and partial product adder 320A respectively. In response to an active signal at control terminal 121B (also called "zero partial product signal"), Booth circuit 310B selects 0 (i.e. zero) as the partial product supplied to partial product adder 320B, thereby forcing the result on 121B to also be zero. The "zero upper" control signal at terminal 123B is used to zero the B operand such that the upper multiplier unit 120B computes CxA instead of Cx[A,B].

Moreover, in this particular embodiment, shifting circuit 130 is implemented by two multiplexers 330A and 330B that are respectively coupled to carry lines 131C and save lines 131S in shift input lines 131. Specifically, first multiplexer 330A has a set of input terminals 332A that are directly coupled to carry lines 323A and another set of input terminals 331A that are coupled to receive a shifted version of the signal from carry lines 323A e.g. by hardwiring as described below. Each set of terminals 331A and 332A are only 2n in number, while carry lines 323A are 3n in number. Therefore, input terminals 332A are coupled to lines that carry the uppermost 2n bits of the signal on lines 323A while terminals 331A are coupled to lines that carry the lowermost 2n bits of the signal on lines 323A. A number of output lines 333A of multiplexer 330A are coupled to output terminals 132 (described above). Multiplexer 330B is coupled in a similar manner to the above-described multiplexer 330A.

In the implementation of FIG. 3, adding circuit 140 includes an adder 340 (e.g. a 4:2 adder) that receives carry-save signals from lines 141 and 142 and generates a carry-save signal of the sum of the received signals on output lines 341. Output lines 341 are in turn coupled to terminals 351 and 352 of a adder 350 (e.g., a 3:2 or full adder). Adder 350 also has another set of terminals 353 that are coupled to the fifth input bus 105 thereby to receive a signal for fifth operand E.

Adding circuit 140 also includes a multiplexer 360 that has a first set of terminals 361 coupled to a source of the ground reference voltage, and a second set of terminals 362 coupled to adding input terminals 143. In response to an active accumulate signal, multiplexer 360 passes an input signal for operand E from input terminals 143 to terminals 353. When signal the accumulate signal is inactive, multiplexer 360 passes an input signal of value 0 (i.e. zero) to terminals 353. Adder 350 adds the signals on terminals 352–353 and supplies a signal in carry-save format on lines 354. Lines 354 are in turn coupled to a carry propagate adder 360 that sums the carry and save signals from lines 354 and supplies the resulting signal on lines 361 (that are coupled to the above-described terminals 145.

In one variant (illustrated in FIG. 4A and as described below) the modified Booth method is preferred, and Booth circuit 310A multiplies the multiplicand with multipliers from the set (0,+1,+1,+2,−2,−1,−1, 0) if a signal at control terminal 123A (also called "negate product signal") is inactive, and alternately with multipliers from the set (0,−1,−1,−2,+2,+1,+1, 0) when the negate product signal is active, for the corresponding combination of digits $d_{i+1} d_i d_{i-1}$={000, 001, 010, 011, 100, 101, 110, 111}.

Table 1 below shows a truth table for the modified Booth method using radix −4 encoding for the inactive and active values of the negate product signal.

TABLE 1

| $y_{i+1}\ y_i\ y_{i-1}$ | positive product | negative product |
|---|---|---|
| 0 0 0 | 0 | 0 |
| 0 0 1 | +1 | −1 |
| 0 1 0 | +1 | −1 |
| 0 1 1 | +2 | −2 |
| 1 0 0 | −2 | +2 |
| 1 0 1 | −1 | +1 |
| 1 1 0 | −1 | +1 |
| 1 1 1 | 0 | 0 |

In this implementation, Booth circuit 310A is implemented by eight encoders 313A–313H (FIG. 4B) that are all identical to encoder 313E (FIG. 4A), wherein A≦E≦H.

Encoder 313E has three input lines labeled $y_{i-1}$, $y_i$ and $Y_{i+1}$ wherein 0≦i≦15 and i represents a position of the line in an input bus 312 of Booth circuit 310A (FIG. 4B). In this implementation, when i=0, input line $y_{-1}$ of the first encoder 313A is coupled to a source of the ground reference voltage, thereby to supply an implicit 0 signal on line $y_{-1}$, and lines $y_0$ and $y_1$ carry the two least significant bits of the multiplier that is received on input bus 312.

Therefore the input buses of each of encoders 313A–313H contain the following sets of lines {$y_{-1}$, $y_0$, $y_1$}, {$y_1$, $y_2$, $y_3$}, {$y_3$, $y_4$, $y_5$}, {$y_5$, $y_6$, $y_7$}, {$y_7$, $y_8$, $y_9$}, {$y_9$, $y_{10}$, $y_{11}$}, {$y_{11}$, $y_{12}$, $y_{13}$}, {$y_{13}$, $y_{14}$, $y_{15}$}. Three bits of the multiplier in these sets of lines are converted by an encoder (e.g. the encoder 313E in FIG. 4A) to a selection signal carried by one of the five lines 413A–413E that form a bus 311E (that is one of buses 311A–311H in FIG. 4B), thereby to control the selection of one of the partial products {+2x,+1x,0x,−1x and −2x} by one of the multiplexers 412A–412H.

Booth circuit 310B is implemented in a manner similar to the implementation of Booth circuit 310A as illustrated in FIG. 4A and described above. Note that instead of the "negate product" signal used in Booth circuit 310A, the "zero partial product" signal used in Booth circuit 310A, the "zero partial product" signal is used in Booth circuit 310B and when active causes the 2:1 multiplexers to drive the signals on the respective output lines 413B–413E inactive (3.g. low) and the signal on first output line 413A active (e.g. high).

Although one particular Booth circuit 310A is illustrated in FIG. 4A and has been described above, any other Booth circuit can be used in other implementations. For example, instead of generating five signals (on lines 413A–413E) that do not need to be decoded by the attached multiplexer (e.g. one of multiplexers 412A–412H in FIG. 4B), three signals can hold, in encoded form, the five signals. In such an implementation the five signals can be represented by values 001, 010, 011, 101 and 110 for the three signals.

FIG. 4B shows the details of a multiplier unit in a partial product adder, such as adder 320A (described above). Adder 320A implements Modified Booth Encoding and uses 4:2 adders connected in a binary tree structure. Specifically, adder 320A performs a 16×32 bit multiplication. The 16-bit multiplier is first encoded into eight sets of signals on buses 311A–311H, which are used to generate the eight partial products, on buses 411A–411H.

Specifically, adder 320A includes eight 5:1 multiplexers each of which receives a signal from one of buses 311A–311H and uses the signal to select one of partial products obtained by multiplying the multiplicand in multipliers 401–405 with one of 2x , 1x, 0x, −1x, or −2x as the 32-bit multiplicand. The partial products selected by mixes 412A–412H are next summed-up together using a binary tree of 4:2 adders. Since there are eight partial products, only two levels of 4:2 adders are needed. The result of the multiplication are outputted on busses 323A and 324A in carry-save format.

Control signals used to operate the implementation of MAC 100 illustrated in FIG. 3 are summarized in Table 2 below.

TABLE 2

| SIGNAL | EFFECT WHEN ACTIVE |
|---|---|
| accumulate | (e.g. value 1) enables multiplexer 360 to pass signal E to adder 350, else (e.g. value 0) multiplexer 360 passes 0 to adder 350. |
| left shift | (e.g. value 1) enables multiplexers 330A and 330B to shift partial product D*B to the left by n bits so as to align with partial product C*A, else (e.g. value 0) perform no shifting and pass the product D*[A, B] straight through. |
| zero partial product | (e.g. value 1) enables Booth circuit 310B to pass 0 to partial product adder 320B, else (e.g. value 0) perform the Booth encoding of C. |
| zero upper | (e.g. value 1) enables the partial product adder 320B to zero the lower operand to perform C*A, else (e.g. value 0) perform C*[A, B]. |
| sign extend | (e.g. value 1) enables partial product adder 320A to extend sign of product D*B to the left by n bits, else (e.g. value 0) perform D*[A, B] with no sign extension of B. |
| negate-product | (e.g. value 1) enables Booth circuit 310A to select the bit patterns to be recognized as 0, and when inactive else (e.g. value 0) the set (0, +1, +1, +2, −2, −1, −1, 0) for a given bits $d_{i+1}d_id_{i-1}$ = {000, 001, 010, 011, 100, 101, 110, 111}. |
| swap-multiplicands | (e.g. value 1) enables multiplexers 111 and 112 to pass operand A to bus 125A and operand B to bus 125B, else when (e.g. value 0) inactive, pass B to bus 125A and A to bus 125B. |

By selectively driving one or more of the signals described in Table 2 above, an appropriate result can be generated at terminals 145 of MAC 100 as described below in Table 3.

Note that the operations Double Negative MAC and Double Negative Multiply in Table 3 can be implemented using the circuitry described herein (and in the attached microfiche Appendices), and the remaining operations in Table 3 are implemented in the circuitry.

TABLE 3

| | | VALUES OF SIGNALS | | | | | | |
|---|---|---|---|---|---|---|---|---|
| OPERATION PERFORMED | RESULT GENERATED | accumulate | left-shift | zero partial product | zero upper | sign extend | negate product | swap multiplicands |
| Double MAC | [A, B]*[C, D]+E | 1 | 0 | 0 | 0 | 0 | 0 | 0 |
| Double Negative MAC | −[A, B]*[C, D]+E | 1 | 0 | 0 | 0 | 0 | 1 | 0 |
| Dual MAC | A*C+B*D+E | 1 | 1 | 0 | 1 | 1 | 0 | 0 |
| Dual Negative MAC | A*C−B*D+E | 1 | 1 | 0 | 1 | 1 | 1 | 0 |
| Dual Cross MAC | A*D+B*C+E | 1 | 1 | 0 | 1 | 1 | 0 | 1 |
| Single MAC | B*D+E | 1 | 1 | 0 | 0 | 0 | 0 | 0 |
| Single Negative MAC | −B*D+E | 1 | 1 | 1 | 0 | 1 | 1 | 0 |
| Double Multiply | [A, B]*[C, D] | 0 | 0 | 0 | 0 | 0 | 0 | 0 |
| Double Negative Multiply | −[A, B]*[C, D] | 0 | 0 | 0 | 0 | 0 | 1 | 0 |
| Dual Multiply | A*C+B*D | 0 | 1 | 0 | 1 | 1 | 0 | 0 |
| Dual Negative Multiply | A*C−B*D | 0 | 1 | 0 | 1 | 1 | 1 | 0 |
| Dual Cross Multiply | A*D+B*C | 0 | 1 | 0 | 1 | 1 | 0 | 1 |
| Single Multiply | B*D | 0 | 1 | 1 | 0 | 1 | 0 | 0 |
| Single Negative Multiply | −B*D | 0 | 1 | 1 | 0 | 1 | 1 | 0 |

One example of MAC 100 can be implemented as described in microfiche Appendix A. In such an example, an adding circuit 140 (see FIG. 3) can be implemented as described in Appendix A at pages 1–4. Similarly, partial product adders 320A and 320B can be implemented as described in Appendix A at pages 127–137. Also, Booth circuits 310A and 310B can be implemented as described in Appendix A at pages 87–93.

Similarly, partial product adders 320A and 320B and Booth circuits 310A and 310B can be implemented in another example as described in Appendix B starting at page 7. As noted above, Appendix A describes a structural (also called "gate-level") embodiment whereas Appendix B describes a behavioral (also called "register-transfer-level" abbreviated as RTL) embodiment.

Although certain embodiments have been described herein, numerous other embodiments will be apparent to the skilled artisan. For example, instead of having two separate signals namely the zero lower partial product signal and the zero upper partial product signal, a single zero partial product signal can be used. Moreover, instead of using a left shifting circuit 130A, a right shifting circuit 130B (FIG. 5) can be used to shift the bits in second intermediate signal 109U to the right prior to addition of the two intermediate signals in the dual mode. Moreover, instead of having the double mode as a default mode, any one of the two modes namely the single mode or the dual mode can be the default mode.

Numerous such modifications and adaptations of the embodiments described herein are encompassed by the attached claims.

What is claimed is:

1. A multiplication accumulation circuit comprising:
a plurality of control lines, an output bus and at least five input buses, wherein:
a first input bus carries a first operand A, a second input bus carries a second operand B, a third input bus carries a third operand C, a fourth input bus carries a fourth operand D, and a fifth input bus carries a fifth operand E;
a first multiplier unit coupled to each of the first input bus, the second input bus, and the fourth input bus, the first multiplier unit having a plurality of first output terminals and a first control terminal, the first control terminal being coupled to a first control line in the plurality of control lines, wherein:
the first multiplier unit multiplies the second operand and the fourth operand and supplies on the first output terminals a first signal indicative of the value B*D in response to an active signal on the first control terminal;
a second multiplier unit coupled to the first input bus, the second input bus, and the third input bus, the second multiplier unit having a plurality of second output terminals and a second control terminal, the second control terminal being coupled to a second control line in the plurality of control lines, wherein:
the second multiplier unit multiplies the first operand and the third operand simultaneous with the multiplication by the first multiplier unit and supplies on the second output terminals a second signal of the value A*C in response to an active signal on the second control terminal;
a shifting circuit coupled to a selected one of the first multiplier unit and the second multiplier unit to receive a selected one of the first signal and the second signal as a shift input signal, the shifting circuit having a plurality of shift output terminals and a shift enable terminal, the shift enable terminal being coupled to a third control line in the plurality of control lines wherein:
the shift input signal has a plurality of bits and the shifting circuit shifts all bits in the shift input signal by a predetermined number of positions and supplies a shifted signal on the shift output terminals in response to an active signal on the shift enable terminal; and
an adding circuit having a plurality of first group of adding input lines, a plurality of second group of adding input lines, a plurality of adding output terminals, a plurality of accumulate input lines, and an accumulate enable terminal, the accumulate enable terminal being coupled to a fourth control line in the plurality of control lines, the adding input lines in one of the first group and the second group being coupled to the shift output terminals, and the adding input lines in the other of the first group and the second group being coupled to the unselected multiplier unit, the accumulate input lines being coupled to the fifth input bus and the adding output terminals being coupled to the output bus, wherein:
the adding circuit adds values of the signals received on the first adding input lines, on the second adding input lines, and on the accumulate input lines, and supplies on the adding output terminals a signal of the value A*C+B*D+E in response to an active signal on the accumulate enable terminal.

2. The multiplication accumulation circuit of claim 1, wherein:
the first multiplier unit has a third control terminal, the third control terminal being coupled to a fifth control line in the plurality of control lines;
the first multiplier unit supplies on the first multiply terminals a third signal indicative of a negative value −B*D in response to active signals on the first control terminal and the third control terminal; and
the adding circuit supplies on the adding output terminals another signal of the value A*C−B*D+E in response to the active signal on the accumulate enable terminal.

3. The multiplication accumulation circuit of claim 1 further comprising:
a first multiplexer having a first group of input terminals coupled to the second input bus and a second group of input terminals coupled to the first input bus, the first multiplexer further having a first select terminal and a group of first output terminals, the group of first output terminals being coupled to the first multiplier unit and the second multiplier unit; and
a second multiplexer having a third group of input terminals coupled to the first input bus and a fourth group of input terminals coupled to the second input bus, the second multiplexer further having a second select terminal and a group of second output terminals, the group of second output terminals being coupled to the first multiplier unit and the second multiplier unit;
wherein:
the first multiplexer supplies the second operand B to the first output terminals, and the second multiplexer supplies the first operand A to the second output terminals in response to active signals on each of the first select terminal and second select terminal;
the first multiplier unit multiplies the first operand A and the fourth operand D and supplies on the first multiply terminals a third signal indicative of the value A*D in response to an active signal on the first control terminal;

the second multiplier unit multiplies the second operand B and the third operand C and supplies on the second multiply terminals a fourth signal indicative of the value B*C in response to an active signal on the second control terminal; and the adding circuit supplies on the adding output terminals another signal of the value A*D+B*C+E in response to the active signal on the accumulate enable terminal.

4. The multiplication accumulation circuit of claim 1, wherein:

the second multiplier unit has a fourth control terminal, the fourth control terminal being coupled to a fifth line in the plurality of control lines;

the second multiplier unit supplies on the second multiply terminals a null signal indicative of the value 0 in response to an active signal on the fourth control terminal; and the adding circuit supplies on the adding output terminals another signal of the value B*D+E in response to the active signal on the accumulate enable terminal.

5. The multiplication accumulation circuit of claim 4, wherein:

the first multiplier unit has a third control terminal, the third control terminal being coupled to a fifth control line in the plurality of control lines;

the first multiplier unit supplies on the first multiply terminals a third signal indicative of a negative value −B*D in response to active signals on the first control terminal and third control terminal; and the adding circuit supplies on the adding output terminals yet another signal of the value −B*D+E in response to the active signal on the accumulate enable terminal.

6. The multiplication accumulation circuit of claim 5, wherein:

the first multiplier unit includes a plurality of subunits for implementing the method Modified Booth Encoding;

each of the subunits selects a first code from a first ordered set {0, +1, +2,−2,−1, 0} in response to an inactive signal on the negate product line; and each of the subunits selects a second code from a second ordered set {0,−1,−2,+2,+1, 0} in response to an active signal on the negate product line.

7. The multiplication accumulation circuit of claim 6, wherein:

the first multiplier unit also includes a pair of first adders, each first adder being coupled to four of the subunits to receive input signals from the subunits; and the first multiplier unit also includes a second adder, the second adder being coupled to each of the first adders to receive signals in carry-save format from the first adders; and the shifting circuit includes a pair of multiplexers, a first multiplexer in the pair receiving carry signals from the second adder and a second multiplexer in the pair receiving save signals from the second adder.

8. The multiplication accumulation circuit of claim 1, wherein:

the second multiplier unit has a fourth control terminal, the fourth control terminal being coupled to a fifth control line in the plurality of control lines;

the second multiplier unit supplies on the second multiply terminals a third signal indicative of value 0 in response to an active signal on the fourth control terminal; and the adding circuit supplies on the adding output terminals another signal of the value B*D in response to an inactive signal on the accumulate enable terminal.

9. The multiplication accumulation circuit of claim 8, wherein:

the first multiplier unit has a third control terminal, the third control terminal being coupled to a sixth control line in the plurality of control lines;

the first multiplier unit supplies on the first multiply terminals a third signal indicative of a negative value −B*D in response to active signals on the third control terminal and on the first control terminal; and the adding circuit supplies on the adding output terminals another signal of the value −B*D in response to the inactive signal on the accumulate enable terminal.

10. The multiplication accumulation circuit of claim 1, wherein:

the first multiplier unit uses the first operand and the second operand as multiplicands, and the third operand as a multiplier to supply on the first multiply terminals a third signal indicative of the values A*D and B*D in response to an inactive signal on the first control terminal;

the second multiplier unit uses the first operand and the second operand as multiplicands, and the fourth operand as a multiplier to supply on the second multiply terminals a fourth signal indicative of the values A*C and B*C in response to an inactive signal on the second control terminal;

the shifting circuit passes the shift input signal without shifting any bits to the shift output terminals in response to an inactive signal on the shift enable terminal; and the adding circuit supplies on the adding output terminals another signal of the value [A,B]*[C,D] in response to an inactive signal on the accumulate enable terminal.

11. The multiplication accumulation circuit of claim 1, wherein:

the first multiplier unit uses the first operand and the second operand as multiplicands, and the third operand as a multiplier to supply on the first output terminals a third signal indicative of the values A*D and B*D in response to an inactive signal on the first control terminal;

the second multiplier unit uses the first operand and the second operand as multiplicands, and the fourth operand as a multiplier to supply on the second output terminals a fourth signal indicative of the values A*D and B*C in response to an inactive signal on the second control terminal;

the shifting circuit passes the shift input signal without shifting any bits to the shift output terminals in response to an inactive signal on the shift enable terminal; and the adding circuit supplies on the adding output terminals another signal of the value [A,B]*[C,D,]+E in response to the active signal on the accumulate enable terminal.

12. The multiplication accumulation circuit of claim 1, wherein operand E is a complex number having a real portion Er and an imaginary portion Ei, and the multiplication accumulation circuit receiving the real portion Er on the fifth input bus during a first cycle and receiving the imaginary portion Ei on the fifth input bus in a second cycle, the multiplication accumulation circuit further comprising:

a first multiplexer having a first group of input terminals coupled to the second input bus and a second group of input terminals coupled to the first input bus, the first multiplexer further having a first select terminal and a group of first output terminals, the first select terminal being coupled to a fifth control line in the plurality of control lines, the group of first output terminals being coupled to the first multiplier unit and the second multiplier unit; and a second multiplexer having a third group of input terminals coupled to the first input bus and a fourth group of input terminals coupled to the second input bus, the second multiplexer further having a second select terminal and a group of second output terminals, the second select terminal being coupled to the fifth control line, the group of second output terminals being coupled to the first multiplier unit and the second multiplier unit;

wherein during the first cycle:

the first multiplexer supplies the second operand B to the first output terminals, and the second multiplexer supplies the first operand A to the second output terminals in response to an active signal on the fifth control line;

the first multiplier unit has a negate product terminal, the first multiplier unit supplies on the first multiply terminals a third signal indicative of a negative value −B*D in response to active signals on the negate product terminal and on the lower multiplicand terminal;

the second multiplier unit has a single word terminal, the second multiplier unit supplies on the second multiply terminals a fourth signal indicative of value A*C in response to an active signal on the single word terminal;

the adding circuit supplies on the adding output terminals another signal of the value A*C−B*D+Er in response to the active signal on the accumulate enable terminal; and wherein during the second cycle:

the first multiplexer supplies the first operand A to the first output terminals, and the second multiplexer supplies the second operand B to the second output terminals in response to an inactive signal on the fifth control line;

the first multiplier unit multiplies the first operand A and the fourth operand D and supplies on the first multiply terminals a third signal indicative of the value A*D in response to an active signal on the lower multiplicand terminal and an inactive signal on the negate product terminal;

the second multiplier unit multiplies the second operand B and the third operand C and supplies on the second multiply terminals a fourth signal indicative of the value B*C in response to an active signal on the upper multiplicand terminal; and the adding circuit supplies on the adding output terminals yet another signal of the value A*D+B*C+Ei in response to an active signal on the accumulate enable terminal.

13. The multiplication and accumulation circuit of claim 1, wherein:

each of the operands is in a fixed point format;

the shifter is coupled to the first multiplier unit;

the shifter shifts all bits in the shift input signal left; and the predetermined number is equal to the number of bits in the first operand.

14. The multiplication and accumulation circuit of claim 13, wherein each of the first operand, the second operand, the third operand and the fourth operand has 16 bits arranged are in the format Q15.

15. The multiplication and accumulation circuit of claim 1, wherein:

the adding circuit includes a multiplexer, the multiplexer having an accumulate enable line, a group of output terminals, a first group of data terminals, and a second group of data terminals, the first group of data terminals being coupled to the fifth input bus, and the second group of data terminals being coupled to a source of a null signal;

the multiplexer couples the group of output terminals to the first group of data terminals in response to an active signal on the accumulate enable line; and the multiplexer couples the group of output terminals to the second group of data terminals in response to an inactive signal on the accumulate control terminal.

16. The multiplication and accumulation circuit of claim 1, wherein:

the first input bus has a first number of lines and the fifth input bus has a fifth number of lines, the fifth number being larger than twice the first number.

17. The multiplication and accumulation circuit of claim 1, wherein the first multiplier unit and the second multiplier unit are the only multiplier units in the multiplication and accumulation circuit.

18. The multiplication and accumulation circuit of claim 1, wherein:

each of the operands is in a fixed point format;

the shifter is coupled to the second multiplier unit;

the shifter shifts all bits in the shift input signal right; and the predetermined number is equal to the number of bits in the first operand.

19. An arithmetic circuit having an output bus and a plurality of input buses, the arithmetic circuit comprising:

a first multiplier unit coupled to each of a first input bus and a second input bus in the plurality of input buses, the first multiplier unit having a plurality of first output terminals;

a second multiplier unit coupled to each of a third input bus and a fourth input bus in the plurality of input buses, the second multiplier unit having a plurality of second output terminals;

a shifting circuit coupled to a selected one of the first multiplier unit and the second multiplier unit, the shifting circuit having a plurality of shift output terminals; and an adding circuit having a plurality of first group of adding input lines, a plurality of second group of adding input lines, a plurality of adding output terminals, the adding input lines in one of the first group and the second group being coupled to the shift output terminals, and the adding input lines in the other of the first group and the second group being coupled to the unselected multiplier unit, and the adding output terminals being coupled to the output bus.

20. The arithmetic circuit of claim 19 wherein the adding circuit has a plurality of accumulate input lines coupled to a fifth input bus in the plurality of input buses.

21. The arithmetic circuit of claim 19 wherein:

the first multiplier unit multiplies the first operand and the third operand and supplies on the first output terminals a first signal; and the second multiplier unit multiplies the second operand and the fourth operand simultaneous with the multiplication by the first multiplier unit and supplies on the second output terminals a second signal.

22. The arithmetic circuit of claim 19 wherein:

the shift input signal has a plurality of bits and the shifting circuit shifts all bits in the shift input signal by a predetermined number of positions and supplies a shifted signal on the shift output terminals.

23. The arithmetic circuit of claim 19 wherein:

the shifter is coupled to the second multiplier unit; and the shifter shifts all bits in the shift input signal right.

24. The arithmetic circuit of claim 19 wherein:

the shifter is coupled to the first multiplier unit; and the shifter shifts all bits in the shift input signal left.

* * * * *